United States Patent
Samie et al.

(10) Patent No.: US 8,747,270 B1
(45) Date of Patent: Jun. 10, 2014

(54) TRANSMISSION WITH MEMS-BASED HYDRAULIC CIRCUIT

(71) Applicant: GM Global Technology Operations LLC, Detroit, MI (US)

(72) Inventors: Farzad Samie, Franklin, MI (US); Andrew L. Bartos, Clarkston, MI (US); Dongxu Li, Troy, MI (US); Chunhao J. Lee, Houston, TX (US); Kumaraswamy V. Hebbale, Troy, MI (US); Xingyong Song, Sterling Heights, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 13/706,396

(22) Filed: Dec. 6, 2012

(51) Int. Cl.
*F16H 31/00* (2006.01)
(52) U.S. Cl.
USPC .......................................................... 475/123
(58) Field of Classification Search
None
See application file for complete search history.

(56) References Cited

U.S. PATENT DOCUMENTS

| | | | |
|---|---|---|---|
| 6,494,804 B1 * | 12/2002 | Hunnicutt et al. | 475/127 |
| 6,540,203 B1 * | 4/2003 | Hunnicutt | 251/26 |
| 6,755,761 B2 * | 6/2004 | Hunnicutt et al. | 475/127 |
| 8,631,919 B2 * | 1/2014 | Lee et al. | 192/48.601 |
| 2012/0090703 A1 * | 4/2012 | Li et al. | 137/487.5 |
| 2012/0090945 A1 * | 4/2012 | Lee et al. | 192/85.63 |
| 2012/0090946 A1 * | 4/2012 | Lee et al. | 192/85.63 |
| 2012/0090947 A1 * | 4/2012 | Lee et al. | 192/85.63 |
| 2012/0090948 A1 * | 4/2012 | Lee et al. | 192/85.63 |

* cited by examiner

*Primary Examiner* — Dirk Wright
(74) *Attorney, Agent, or Firm* — Quinn Law Group, PLLC

(57) ABSTRACT

A vehicle includes an engine, torque converter assembly, and transmission. The torque converter assembly includes a torque converter clutch (TCC). The transmission is connected to the engine via the torque converter assembly, and includes rotating and braking clutches, a pump, and a valve body assembly (VBA). The VBA includes Micro Electro Mechanical Systems (MEMS) pressure sensors and high-flow, hybrid MEMS flow control valves. Each MEMS pressure sensor and each MEMS control valve is in fluid communication with a corresponding one of the TCC, the rotating, and the braking clutches. The VBA includes first and second low-flow, fully MEMS valves which control line pressure to the VBA and fluid pressure to the TCC, respectively. The VBA delivers fluid pressure to the clutches, alone or in different combinations, to establish at least six different forward drive states of the transmission.

18 Claims, 6 Drawing Sheets

|  | CBR1 | C456 | C826 | C1234 | C35R |
|---|---|---|---|---|---|
| P | H | L | L | L | L |
| R | H | L | L | L | H |
| N | H | L | L | L | L |
| 1st B | H | L | L | H | L |
| 1 | L | L | L | H | L |
| 2 | L | L | H | H | L |
| 3 | L | L | L | H | H |
| 4 | L | H | L | H | L |
| 5 | L | H | L | L | H |
| 6 | L | H | H | L | L |

TRANSMISSION WITH MEMS-BASED HYDRAULIC CIRCUIT

TECHNICAL FIELD

The present disclosure relates to a transmission having a Micro Electro-Mechanical Systems (MEMS)-based hydraulic circuit.

BACKGROUND

In a vehicle powertrain, a transmission is used to transfer input torque from an internal combustion engine to the vehicle's drive axles. Various gear states of the transmission provide selectable gear and speed ratios, as well as different levels of torque multiplication. In an automatic transmission, the shift between speed ratios occurs through an automated actuation of hydraulic components. This process is controlled via a valve body and one or more hydraulic valves.

SUMMARY

A transmission is disclosed herein having a Micro Electro-Mechanical Systems (MEMS)-based hydraulic circuit. The MEMS-based hydraulic circuit provides fluid pressure and flow control to the transmission, e.g., a 6-speed front-wheel or rear-wheel drive automatic transmission. In the present design, conventional low-flow pulse width modulation (PWM) and fluid regulating valves are replaced by small, high-flow/high-pressure "hybrid MEMS" flow control valves. Additionally, "fully MEMS" pressure transducers are used to provide closed-loop pressure control, and low-flow "fully MEMS" valves are used to control line pressure. As used herein, the term hybrid MEMS refers to a combination of MEMS and conventional structure, as described in further detail hereinbelow, e.g., hybrid MEMS solenoid valves, while a fully MEMS valve is constructed solely of MEMS structure. The resultant transmission has a smaller, lighter valve body which may be used to provide accurate and repeatable transmission shift control.

In a particular embodiment, six hybrid MEMS flow control valves, for instance high-flow MEMS solenoid valves, are used to feed rotating and braking clutches of a 6-speed transmission having two or three planetary gear sets depending on the configuration. One of the MEMS solenoid valves regulates engagement/application of a torque converter clutch (TCC) within a hydrodynamic torque converter assembly. Low-flow, fully MEMS valves are used for line pressure control and enablement of the TCC.

In particular, a vehicle is disclosed herein that includes an engine, a hydrodynamic torque converter assembly having a torque converter clutch (TCC), and a transmission. The transmission is operably connected to the engine via the hydrodynamic torque converter assembly, and includes rotating and braking clutches, a pump, and a valve body assembly (VBA).

The VBA may include MEMS pressure sensors and high-flow, hybrid MEMS flow control valves. Each MEMS pressure sensor, e.g., fully-MEMS devices, and each flow control valve is in fluid communication with a corresponding one of the TCC, the rotating clutches, and the braking clutches. The VBA also includes first and second low-flow, fully MEMS valves. One fully MEMS valve controls line pressure to the VBA. Another delivers fluid pressure to the TCC to enable the TCC. The VBA delivers fluid pressure to the rotating and braking clutches, alone or in different combinations, to thereby establish one of at least six different forward drive states of the transmission.

The hybrid MEMS pressure sensors may include, in a possible embodiment, six high-flow, hybrid MEMS solenoid valves. In a particular embodiment, in order to qualify as a "high-flow" valve, the flow rate through the hybrid MEMS valve may be at least 10 liters/min. By way of contrast, a conventional low-flow valve supplies fluid at a flow rate of about 1 L/min, and has to work with a separate regulator valve. The transmission may include first and second gear sets. In this embodiment, the rotating and braking clutches may include a first rotating clutch that selectively connects a transmission input member to a third node of the second gear set, and that is controlled via a first one of the six MEMS solenoid valves. A second rotating clutch selectively connects a second node of the first gear set to a first node of the second gear set, and is controlled via a second one of the MEMS solenoid valves. A third rotating clutch selectively connects the second node of the first gear set to a fourth node of the second gear set, and is controlled via a third one of MEMS solenoid valves.

In the same embodiment, a first braking clutch selectively connects a third node of the second gear set to a stationary member, and is controlled via a fourth one of the MEMS solenoid valves. A second braking clutch selectively connects the fourth node of the second gear set to the stationary member, and is controlled via a fifth one of the MEMS solenoid valves.

In another embodiment, the vehicle includes first, second, and third gear sets, and the rotating and braking clutches include a first rotating clutch that selectively connects the input member to the second node of the first gear set, and that is controlled via a first one of the MEMS solenoid valves. The second rotating clutch selectively connects the input member to the third node of the first gear set, and is controlled via a second one of the MEMS solenoid valves. The first braking clutch selectively connects the third node of the first gear set to the stationary member, and is controlled via a third one of the MEMS solenoid valves.

In the same embodiment, the second braking clutch selectively connects the second node of the first gear set to the stationary member, and is controlled via a fourth one of the MEMS solenoid valves. A third braking clutch selectively connects the first node of the third gear set to the stationary member, and is controlled via a fifth one of the MEMS solenoid valves. The output member of the transmission is continuously connected to the second node of the third gear set, and the input member is continuously connected to the third node of the second gear set.

The above features and advantages, and other features and advantages, of the present invention are readily apparent from the following detailed description of some of the best modes and other embodiments for carrying out the invention, as defined in the appended claims, when taken in connection with the accompanying drawings.

DETAILED DESCRIPTION

Figure 1:
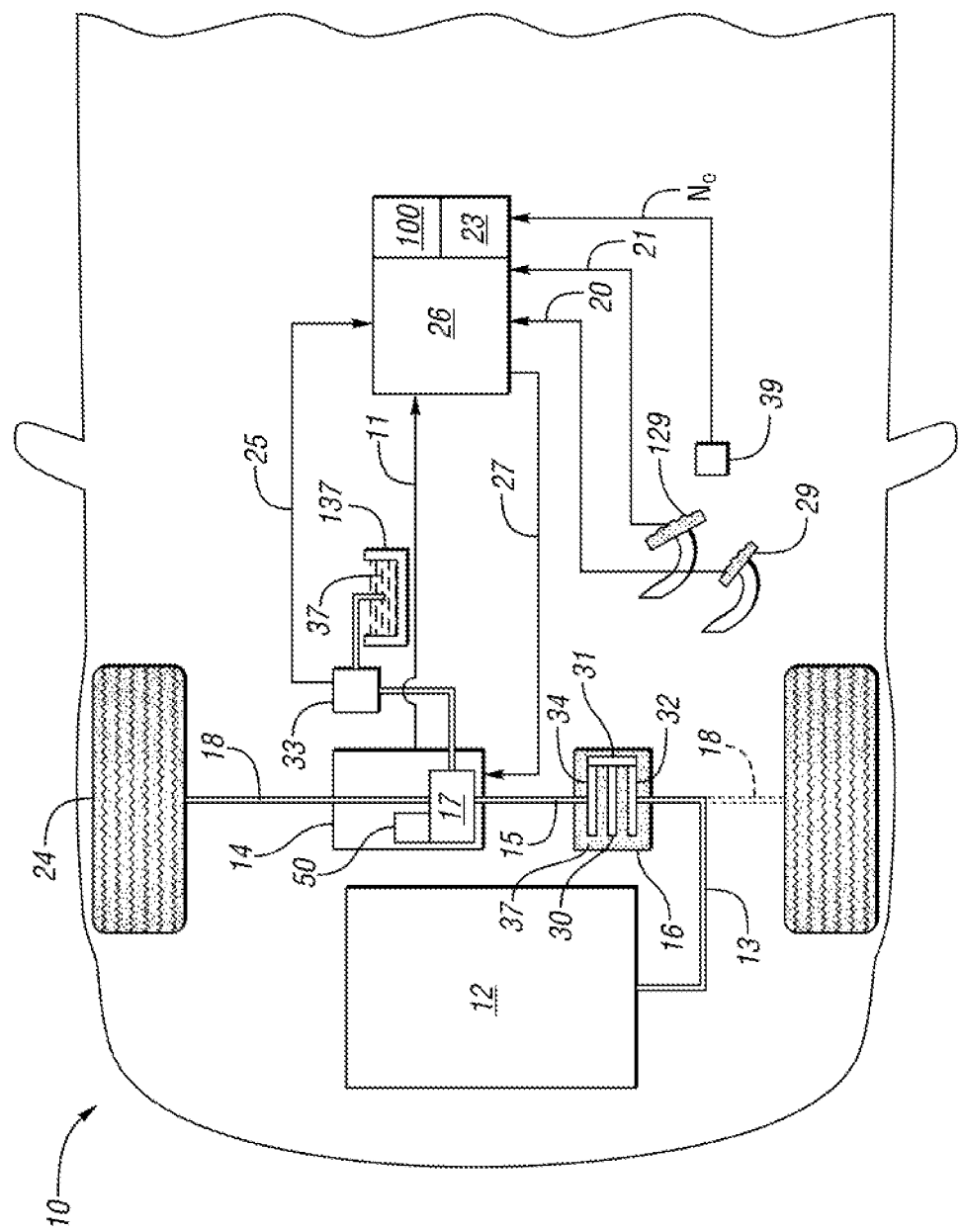
FIG. 1 is a schematic illustration of an example vehicle having an automatic transmission that includes a MEMS-based hydraulic circuit as disclosed herein.
Figure 7:
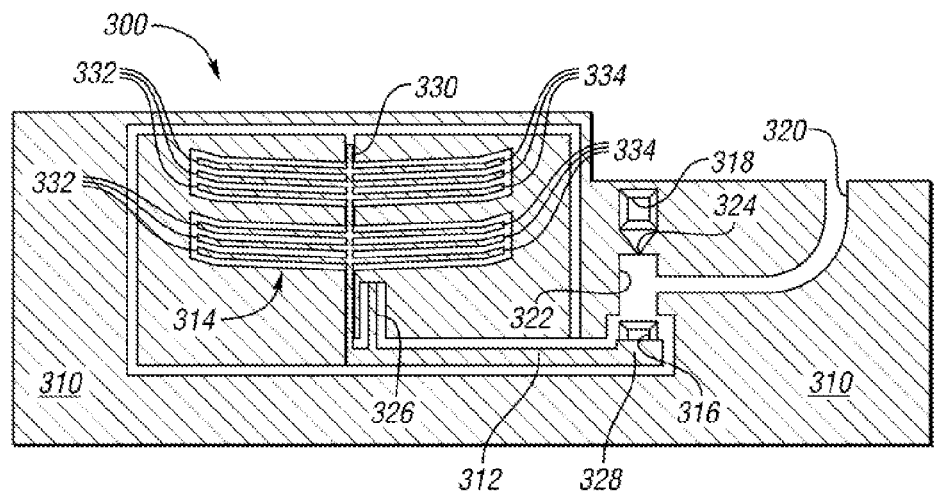
FIG. 7 is schematic cross-sectional view of an example MEMS device in the form of a microvalve actuator.
Figure 8:
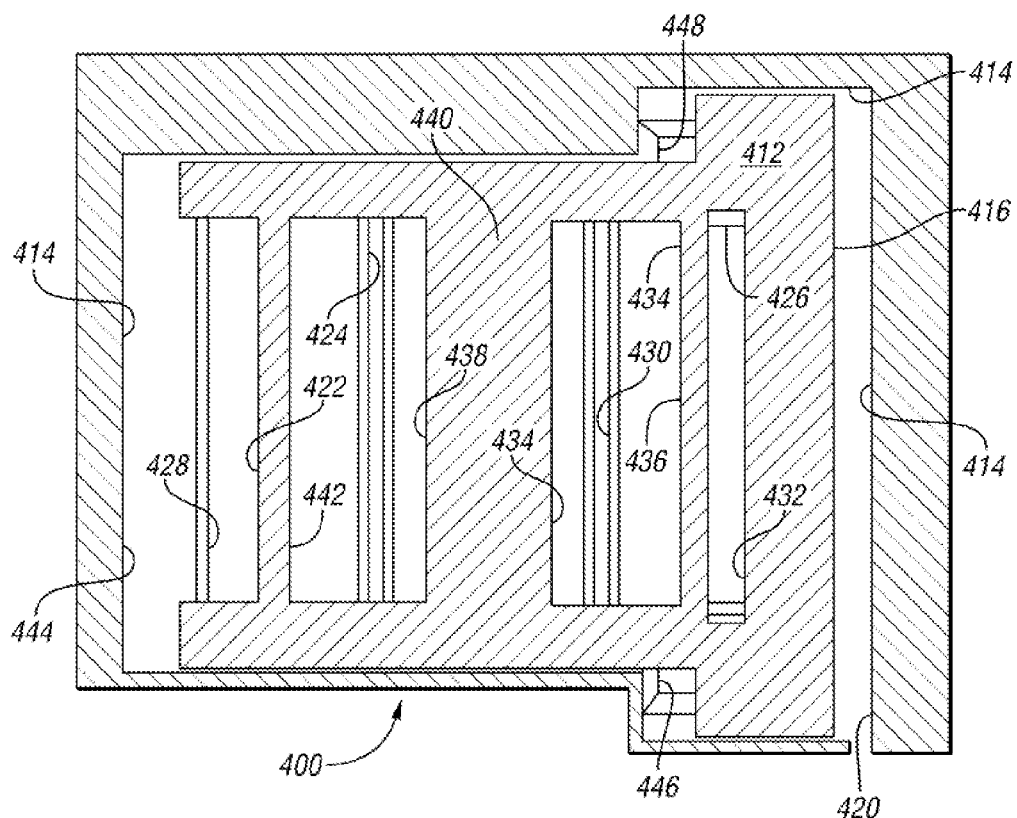
FIG. 8 is a schematic cross-sectional view of an example MEMS device in the form of a spool valve which may be used alone or in conjunction with the MEMS microvalve actuator of FIG. 7.

Referring to the drawings, and beginning with FIG. 1, an example vehicle 10 includes an internal combustion engine 12, an automatic transmission 14, and a controller 26. A Micro Electro Mechanical Systems (MEMS)-based valve body assembly (VBA) 50 is used in all embodiments as part of the transmission 14, with the structure and function the VBA 50 described in detail below with reference to FIGS. 4-6. Examples of the transmission 14 are described below with reference to FIGS. 2-3. Non-limiting example MEMS devices are shown in FIGS. 7 and 8.

The engine 12 of FIG. 1 includes an output shaft 13 which is coupled to an input member 15 of the transmission 14 via a hydrodynamic torque converter assembly 16. Transfer of engine torque to the transmission 14, as well as any necessary torque multiplication, occurs at a variable rate through the torque converter assembly 16 as a function of changing engine speed. The torque converter 16 includes a stator 30, an impeller/pump 32, and a turbine 34. A torque converter clutch (TCC) 31 may be used to selectively lock the pump 32 to the turbine 34 above a threshold lockup speed. The pump 32 may be bolted or otherwise directly connected to the output shaft 13 of the engine 12 to rotate at engine speed. The turbine 34 in turn is connected to the input member 15 of the transmission 14. In this manner, the input member 15 is allowed to rotate at turbine speed, and to carry input torque to the transmission 14.

The transmission 14 also includes an output member 18. The output member 18 is connected to a set of drive wheels 24. The output member 18 ultimately transmits a transmission output torque from various torque transfer elements 17 of the transmission 14 to the drive wheels 24. The torque transfer elements 17 may be embodied as, for instance, multiple rotating and braking clutches, as well as multiple planetary gear sets each having a plurality of nodes embodied variously as sun, ring, or planetary carrier members. The torque transfer elements 17 may be selectively actuated via the MEMS-based VBA 50 of FIG. 4. The VBA 50 is powered by fluid 37 drawn from a sump 137 and circulated via a transmission pump 33.

The controller 26 shown in FIG. 1 receives input signals (arrow 11) from the transmission 14 and executes the required flow and pressure control of the VBA 50 and any connected MEMS devices via a set of output signals (arrow 27). Example input signals (arrow 11) may include, but are not necessarily limited to, a transmission output speed (arrow $N_o$), a value which may be measured by one or more sensors 39. A sensor 39 is shown separately in FIG. 1 for clarity, but the sensor(s) 39 could also be positioned as needed anywhere within the vehicle 10, e.g., at or along the output member 18 and/or at the drive wheels 24. The input signals (arrow 11) may also include a throttle level (arrow 21) of a throttle input device such as an accelerator pedal 129, a braking level (arrow 20) such as pedal position/travel and/or a braking force applied to a brake pedal 29, a PRNDL setting of the transmission 14, which may be known from shift logic or detected via a position of a shift lever (not shown), a fluid temperature signal (arrow 25) of the fluid 37 contained in the sump 137, onboard diagnostic signals, and/or any other suitable signals or data elements.

Still referring to FIG. 1, the controller 26 may be configured as a microprocessor-based computing device having a tangible, non-transitory memory device 23 on which is recorded instructions encoding shift logic 100. The shift logic 100 may be executed to shift the transmission 14, via control of the MEMS-based VBA 50, into or out of the various available gear states, such as is described below with reference to FIG. 6. Execution of the shift logic 100 selectively controls pressure and flow to the various clutches of the transmission 14, for instance according to the shift table 90 of FIG. 6.

The controller 26 of FIG. 1 may include a microprocessor/central processing unit (CPU), and additional memory including but not necessarily limited to read only memory (ROM), random access memory (RAM), electrically-erasable programmable read-only memory (EEPROM), etc., and circuitry including but not limited to: a high-speed clock (not shown), analog-to-digital (A/D) circuitry, digital-to-analog (D/A) circuitry, a digital signal processor, and any necessary input/output (I/O) devices and other signal conditioning and/or buffer circuitry.

Figure 2:
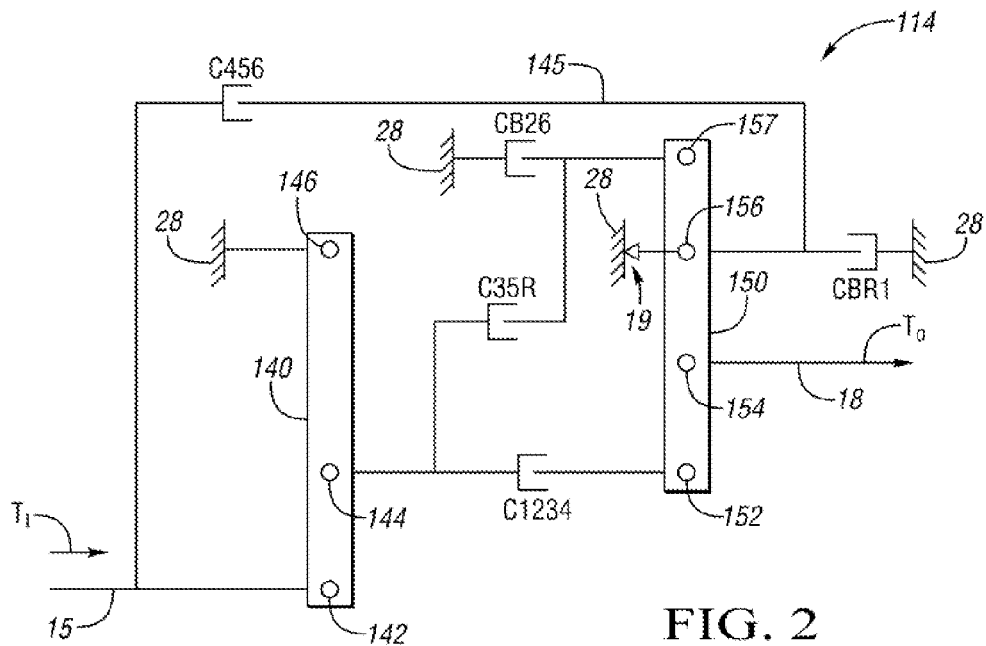
FIG. 2 is a lever diagram describing an example rear-wheel drive, 6-speed automatic transmission usable with the example vehicle shown in FIG. 1.

Referring to FIG. 2, the transmission 14 of FIG. 1 may be optionally configured as an example 6-speed rear-wheel drive transmission 114. The transmission 114 includes first and second gear sets 140 and 150, respectively. The first gear set 140 includes respective first, second, and third nodes 142, 144, and 146, which may be embodied as a ring gear, a planetary carrier, and sun gear, respectively, in one possible embodiment. The input member 15 may be directly connected to the first node 142 to deliver the input torque (arrow $T_I$) to the first node 142, and to a first rotating clutch C456.

As used hereinafter, the nomenclature of the various rotating and braking clutches refers to the particular gear states controlled via actuation of the clutch, e.g., $1=1^{st}$ gear, $2=2^{nd}$ gear, etc., R=reverse, etc. In the same clutch labels, "C" refers generally to "clutch", "B" refers to "braking clutch", and the absence of a B indicates that the clutch is a rotating clutch.

The second node 144 of the first gear set 140 shown in FIG. 2 is connected to a second rotating clutch C1234 and to an input side of a third rotating clutch C35R. The third node 146 of the first gear set 140 is selectively grounded to a stationary member 28 of the transmission 114 as shown.

With respect to the second gear set 150, this component includes first, second, third, and fourth nodes 152, 154, 156, and 157, respectively, which may be embodied as a respective sun gear, ring gear, carrier member, and another sun gear in an example embodiment. The second node 154, which is directly connected to the transmission output member 18, ultimately transmits the output torque (arrow To) to the drive wheels 24 shown in FIG. 1. The third node 156 is connected to a first braking clutch CBR1, which is also connected to the stationary member 28. The fourth node 157 of the second gear set 150 is connected to the output side of a second braking clutch CB26, which is connected on the opposite side to the stationary member 28 as shown.

The first rotating clutch C456 transmits the input torque (arrow $T_I$) from the input member 15 to the third node 156 of the second gear set 150 via an interconnecting member 145 as shown. A freewheeling element 19, e.g., an overrunning clutch or a passive one-way clutch, may be connected between the stationary member 28 and the third node 156 of the second gear set 150 so as to permit rotation with respect to the third node 156 in only one rotational direction.

Figure 3:
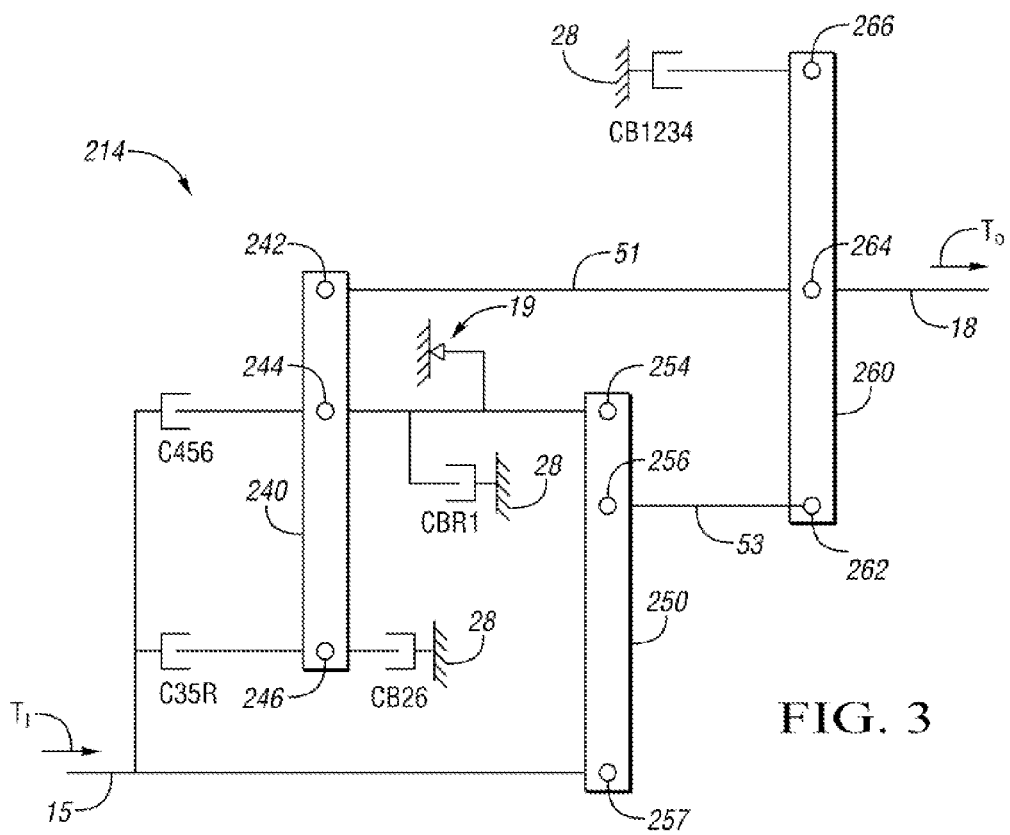
FIG. 3 is a lever diagram describing an example front-wheel drive, 6-speed automatic transmission usable with the example vehicle shown in FIG. 1.

Referring to FIG. 3, the transmission 114 of FIG. 2 is shown as an alternative example 6-speed front-wheel drive transmission 214. The transmission 214 may include first, second, and third gear sets 240, 250, and 260, respectively, each having three nodes. That is, the first gear set 240 includes respective first, second, and third nodes 242, 244, and 246, while the second gear set includes respective first, second, and third nodes 254, 256, and 257. Likewise, the third gear set 260 includes first, second, and third nodes 266, 264, and 262, respectively. The transmission 214 includes the braking clutches CB26, CBR1, and CB1234, as well as the rotating clutches C35R and C456. As with the embodiment of FIG. 2, the free-wheeling element 19 may prevent rotation with respect to a node of the second gear set 250, in this case the first node 254.

Nodes 242, 244, and 246 of the first gear set 240 may, in one possible embodiment, be configured as a ring gear, a carrier member, and a sun gear, respectively. The input shaft 15 may be selectively connected to the second and third nodes 244 and 246, respectively, via the respective clutches C456 and C35R. Node 242 is directly connected to the second node 264 of the third gear set 260 via an interconnecting member 51.

Nodes 254, 256, and 257 of the second gear set 250 may be configured as a ring gear, a carrier member, and a sun gear, respectively. Node 257 is directly connected to the transmission input member 15. Node 254 is connected to node 244 of the first gear set 240. The free-wheeling element 19 connects to the stationary member 28 to allow rotation with respect to the first node 254 of the second gear set 250 in only one rotational direction.

With respect to the third gear set 260 shown in FIG. 3, nodes 262, 264, and 266 may be embodied as a ring gear, a carrier gear, and a sun gear, respectively. Node 266 is selectively connected to stationary member 28 via clutch CB1234. Node 264 is connected to node 242 of the first gear set 240, as well as to the output shaft 18 of transmission 14. Node 262 is directly connected to node 256 of the second gear set 250 via another interconnecting member 53.

Figure 4:
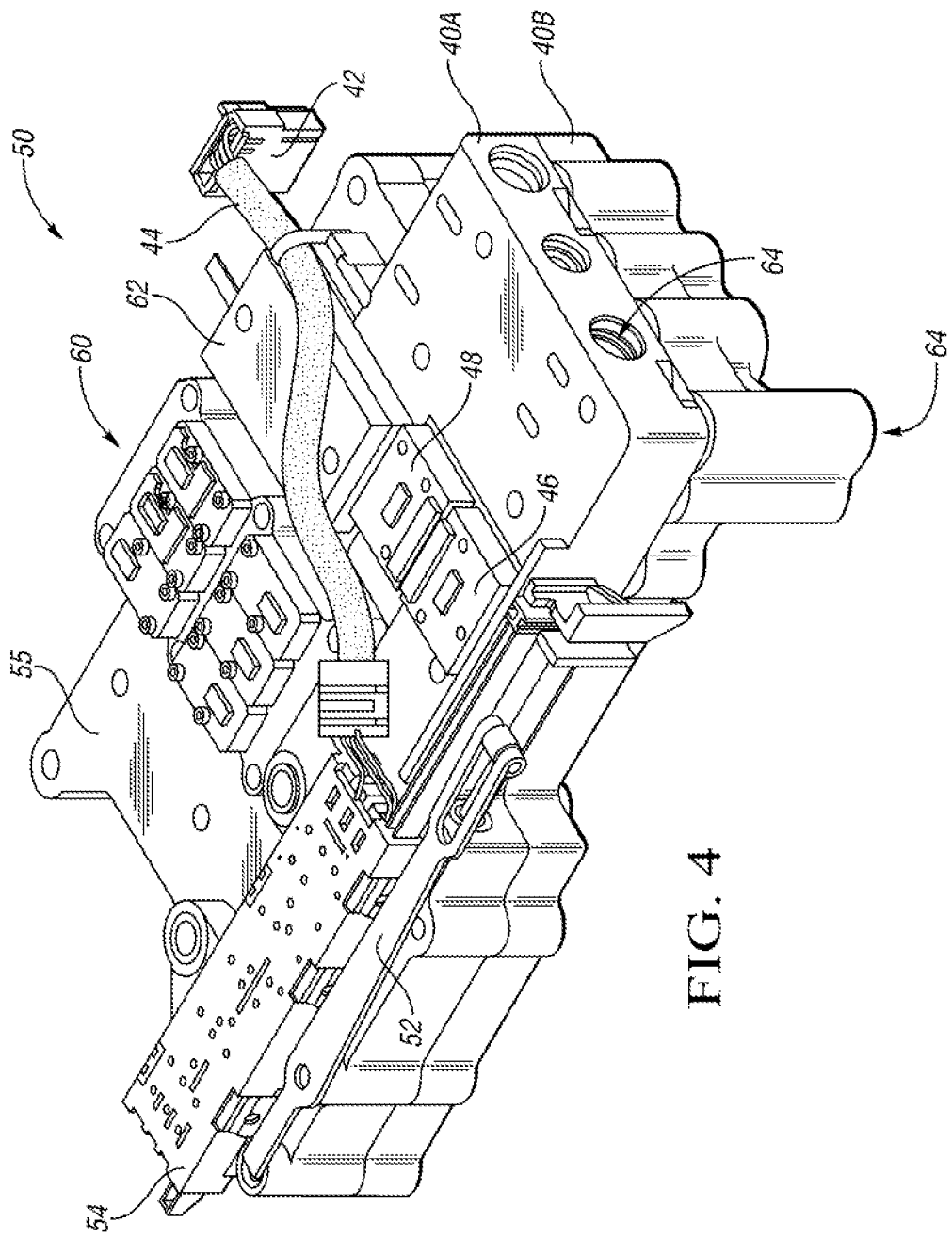
FIG. 4 is a top perspective view of a valve body assembly (VBA) that may be used to provide fluid power to the example transmissions shown in FIGS. 2 and 3.

Referring to FIG. 4, the MEMS-based VBA 50 noted above may be used to supply fluid pressure and flow to the various rotating and braking clutches of the transmissions 114 and 214 described above. As used herein, the term "MEMS" refers to a class of systems having features in the micrometer size range. MEMS devices, which may include electrical and mechanical components, are typically produced through a micromachining process. The term "micromachining" generally refers to the production of three-dimensional structures and moving parts through processes including modified integrated circuit/computer chip fabrication techniques, e.g., chemical etching, and materials such as silicon.

The term "microvalve" as used herein generally refers to a valve having features with sizes in the micrometer range, and thus by definition is at least partially formed by micromachining The term "microvalve device" refers to a device that includes at least a microvalve, but which may also include other components, in which case the microvalve device forms a MEMS solenoid valve or another type of hybrid MEMS device. MEMS devices may be operating in conjunction with other MEMS/micromachined devices or components or may be used with standard sized, i.e., larger, components, such as those produced by mechanical machining processes. The term "hybrid MEMS" includes elements of both microvalves and standard-size valves, e.g., a MEMS actuator with a conventional metal spool, while a "fully MEMS" valve is, as the name indicates, entirely MEMS in its construction.

The various MEMS valves disclosed hereinafter may include, in some embodiments, a MEMS Pilot Direct Activating (PDA) microvalve, a device which provides a desired control pressure or pilot pressure to regulate pressure to a valve that is next in line. Such a device may act as a pilot valve to a MEMS spool valve, or, in a hybrid MEMS device, for an intermediate size metal spool valve. Intermediate metal regulating spool valves may be configured much like a conventional valve spool of the type known in the art, but reduced to approximately 40-50% of the conventional size. With such reduced size, the valve spool thus may be controlled directly by a MEMS PDA. Example MEMS devices are described below with reference to FIGS. 7 and 8.

The layout of the MEMS-based VBA 50 of FIG. 4 includes a valve body 40 having a first half 40A and a second half 40B. While not shown in FIG. 4, the facing surfaces of the first and second halves 40A, 40B, when assembled together as shown, collectively define a plurality of fluid channels of the VBA 50. These channels direct the fluid 37 of FIG. 1 within the valve body 40 to the various MEMS devices of the VBA 50. The output signals (arrow 27 of FIG. 1) are transmitted by the controller 26 of FIG. 1 to the VBA 50 via a cable 44, which terminates in an electrical connector 42 suitable for connection to a wiring harness (not shown). Auxiliary electrical power may be provided as needed via the cable 44 or any another suitable electrical connection. Fluid ports 64 are defined by the halves 40A, 40B, with the fluid ports 64 directing the fluid 37 of FIG. 1 where needed via hose, tubing, or other conduit (not shown), including to the various clutches of the transmissions 114, 214.

A manual PRNDL valve 54 may be bolted to an outer surface 55 of the valve body 40. As understood in the art, a détente lever 52 moves in response to movement of a shift lever (not shown) within the passenger compartment of the vehicle 10 shown in FIG. 1 to thereby place the transmission 14 of FIG. 1, via the PRNDL valve 54, into park (P), reverse (R), neutral (N), drive (D), or low drive (L) mode.

Also bolted to the outer surface 55 are a set of high-flow MEMS solenoid valves 60. In an example configuration, six high-flow MEMS solenoid valves 60 are positioned on the outer surface 55 as shown. In this embodiment, five of the MEMS solenoid valves 60 controls the feed of fluid 37 to a corresponding one of clutches C1234, CB26, C35R, C456, CB1R of FIGS. 2 and 3, and the sixth MEMS solenoid valve 60 controls the flow of fluid 37 to the TCC 31 shown schematically in FIG. 1. The MEMS solenoid valves 60 replace low-flow/pressure PWM and regulating valves of a conventional transmission, devices which are typically rated for 120 PSIG or less, with much smaller, higher flowing devices rated for up to about 300 PSIG in some embodiments.

The VBA 50 of FIG. 4 may also include a bank of MEMS pressure sensors 62 and a pair of low-flow MEMS valves 46, 48, all of which may be bolted to the upper surface 55 adjacent to the high-flow MEMS solenoid valves 60 as shown. As with the high-flow MEMS solenoid valves 60, the bank of MEMS pressure sensors 62 may include six identically-configured MEMS pressure sensors 62, five of which sense the pressure of the fluid 37 delivered to a corresponding one of clutches C1234, CB26, C35R, C456, CB1R of FIGS. 2 and 3, and another of which senses the pressure of the fluid 37 delivered to the TCC 31 of FIG. 1. The MEMS valves 46 and 48 may be fully MEMS devices, a term described elsewhere above, and each is configured to control a corresponding one of two functions: line pressure to the valve body 40 or enablement of the TCC 31 of FIG. 1.

Figure 5:
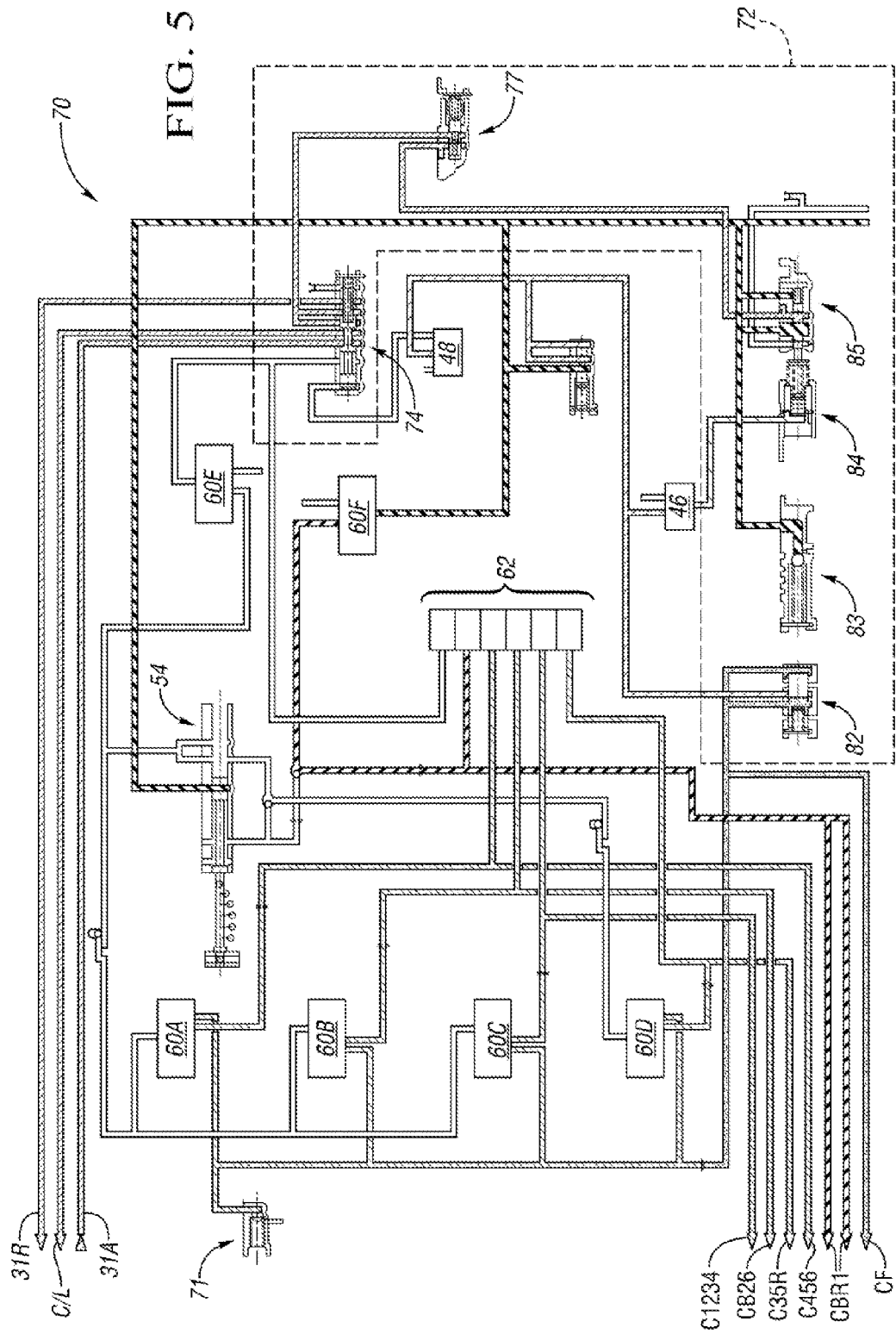
FIG. 5 is a schematic illustration of a hydraulic circuit that may be configured as part of the VBA shown in FIG. 4, and that may be used within the example transmissions shown in FIGS. 2 and 3.

The positioning required for achieving these functions is shown in FIG. 5, which depicts an example hydraulic control circuit 70 for the VBA 50 of FIG. 4. The six high-flow MEMS solenoid valves 60 of FIG. 4, all of which may be in fluid communication with an exhaust/pressure relief valve 71 as shown, are labeled 60A-F to differentiate their respective control functions. All of the MEMS solenoid valves 60A-F may be hybrid MEMS devices, e.g., MEMS pilot and conventional spool valves.

The MEMS solenoid valve 60A may be a normally-high solenoid valve which controls flow to the rotating clutch C456. Valve 60B may be a normally-low solenoid valve which controls flow to the braking clutch CB26. Likewise, valve 60C may be a normally-low solenoid valve which controls flow to the rotating clutch C1234. Valve 60D may be a normally-high solenoid valve which controls flow to the rotating clutch C35R. Valve 60E may be a normally-low solenoid valve which controls flow to the TCC 31 of FIG. 1. Valve 60F may be a normally-low solenoid valve as well, and configured to control flow to the braking clutch CBR1. Each MEMS solenoid valve 60A-F is in fluid communication with a corresponding port of the MEMS pressure sensors 62 described above.

The low-flow MEMS valve 46 of FIG. 5, with "low" being as low as 1 L/min or otherwise low relative to the flow rate of the high-flow valves used in the VBA 50, is in fluid communication with a collection of non-MEMS or conventional control valves 72 all located externally with respect to the VBA 50 of FIG. 4. The control valves 72 may include a TCC control valve 74, a converter feed limit valve 77, a compensator feed valve 82, a line pressure relief valve 83, an isolator valve 84, and a pressure regulator valve 85, the functions of which are well known in the art. The valves 74, 77, 83, 84, and 85 may be located with the pump 33 shown in FIG. 1. Outlet ports may include a TCC release port 31R, a cooler/lube port (C/L), a TCC apply port 31A, and ports in fluid communication with each of the clutches C1234, CB26, C35R, C456, CBR1, as well as a compensator feed port (CF), i.e., a port which supplies pressurized fluid to a balance chamber or compensator of the various clutches as needed.

Figure 6:
FIG. 6 is a shift table describing possible clutch states for different transmission gear states or modes.

Referring to FIG. 6, an example shift table 90 is shown for the transmission 14 of FIG. 1, including the two example embodiments of FIGS. 2 and 3. When recorded instructions embodying the method 100 are executed by the controller 26 shown in FIG. 1, the controller 26 reads the input signals (arrow 11) and transmits the output signals (arrow 27) shown in the same Figure to thereby shift the transmission 14 to one of the commanded gear states, i.e., P, R, N, or 1-6, possibly including a 1$^{st}$ gear braking state (1B). The VBA 50 of FIG. 4, using fluid pressure as delivered via the hydraulic control circuit 70 of FIG. 5, sets the fluid pressure levels to the various clutches CBR1, C456, CB26, C1234, and C35R as shown in table 90, with H representing a "high" setting, e.g., 300 PSI, and L representing a "low" setting, e.g., return spring pressure.

Referring to FIG. 7, a schematic cross-sectional view is provided for an example MEMS device in the form of a MEMS microvalve 300. The MEMS microvalve 300 may be referred to as a pressure differential actuator or a pilot direct actuating (PDA) valve. The MEMS microvalve 300 may include a body 310. The MEMS microvalve 300 may be formed from several material layers, e.g., semiconductor wafers. Likewise, the body 310 may also be formed from multiple layers. For example, cross-sectioned portions shown may be taken through a middle layer of the MEMS microvalve 300, with two other layers existing behind and in front of the middle layer relative to the view in FIG. 7. The other layers of the body 310 may include solid covers, port plates, or electrical control plates.

The MEMS microvalve 300 of FIG. 7 may include a beam 312 actuated by a valve actuator 314. Selective control of the valve actuator 314 causes the beam 312 to selectively alter the flow of fluid between an inlet port 316 and an outlet port 318. By varying the fluid flow between the respective inlet and outlet ports 316 and 318, the MEMS microvalve 300 varies pressure in a pilot port 320. As described herein, the pilot port 320 may be connected to additional valves or devices in order to affect hydraulic control thereof through a pilot signal which varies based upon the pressure in the pilot port 320.

The inlet port 316 is connected to a source of high-pressure fluid, typically the pump 33 of FIG. 1. The outlet port 318 is connected to a low-pressure reservoir or fluid return (not shown). The outlet port 318 may be considered to be at ambient pressure, and thus acts as ground or a zero state in the operation of the MEMS microvalve 300.

Still referring to FIG. 7, the beam 312 moves in a continuously variable manner between a first position, as illustrated in FIG. 7, a second position (not shown), and multiple intermediate positions. In the first position, the beam 312 does not completely block the inlet port 316. However, in the second position, the beam 312 blocks the inlet port 316 to prevent substantially all of the flow from the pump 33 of FIG. 1. A first chamber 322 is in fluid communication with both the inlet port 316 and the outlet port 318. However, communication between the outlet port 318 and the first chamber 322 and inlet port 316 is restricted by an outlet orifice 324. High volume or fluid flow through the outlet orifice 324 causes a pressure differential to build between the first chamber 322 and the outlet port 318.

The beam 312 is pivotally mounted to a fixed portion of the body 310 by a flexure pivot 326. The opposite portion of the beam 312 from the flexure pivot 326 is a movable end 328, which moves up and down as viewed in FIG. 7 to selectively and variably cover and uncover the inlet port 316. When the beam 312 is in the second position, it allows little or no flow from the inlet port 316 to the first chamber 322. Any pressurized fluid in the first chamber 322 bleeds off through the outlet orifice 324 to the outlet port 318. As the beam 312 is moved toward the first (open) position, the inlet port 316 is progressively uncovered, allowing increased flows of fluid from the inlet port 316 into the first chamber 322. All of the faster-flowing fluid cannot be drained through the outlet orifice 324, which causes a pressure differential to form as the fluid flows through the outlet orifice 324, thus raising pressure in the first chamber 322.

As the inlet port 316 is further opened to the first position of FIG. 7, fluid gradually flows faster through the outlet orifice 324, thus causing a larger pressure differential and further raising the pressure in the first chamber 322. When the beam 312 is in the first position, it allows high flow from the inlet port 316 to the first chamber 322. Therefore, the pressure in the first chamber 322 can be controlled by controlling the rate of flow from the inlet port 316 through the first chamber 322 and the outlet orifice 324 to the outlet port 318. The position of the beam 312 controls the rate of flow of the fluid from the inlet port 316, and thus the pressure in the first chamber 322.

The valve actuator 314 shown in FIG. 7 selectively positions the beam 312. The valve actuator 314 includes an elongated spine 330 attached to the beam 312. The valve actuator 314 further includes a plurality of first ribs 332 and a plurality of second ribs 334, which are generally located on opposing sides of the elongated spine 330. Each of the first ribs 332 has a first end attached to a first side of the elongated spine 330 and a second end attached to the body 310. Similar to the first ribs 332, each of the second ribs 334 has a first end attached to the elongated spine 330 and a second end attached to the fixed portion of the body 310.

The elongated spine 330 and the first ribs 332 and the second ribs 334 may appear, as illustrated in FIG. 7, as being disconnected from the body 310. However, the elongated spine 330, the first ribs 332, and the second ribs 334 are formed from the same material and are connected to the body 310 at some point in order to allow relative movement. However, the connection may be below the cross-sectioned plane shown in FIG. 7. Generally, the elongated spine 330, the first ribs 332, and the second ribs 334 may be considered the moving portions of the actuator 314.

The respective first and second ribs 332 and 334 are configured to thermally expand/elongate and contract/shrink in response to temperature changes within the respective first and second ribs 332 and 334. Electrical contacts (not shown) are adapted for connection to a source of electrical power to supply electrical current flowing through the respective first and second ribs 332 and 334 to thermally expand the first and second ribs 332 and 334, respectively.

The valve actuator 314 of FIG. 7 is controlled by the controller 26 of FIG. 1 or another suitable device which supplies variable current to the respective first and second ribs 332 and 334. As the first ribs 332 and the second ribs 334 expand due to sufficient current flow, the elongated spine 330 moves or stretches downward as viewed in FIG. 7, thereby causing the beam 312 to rotate in the generally counter-clockwise direction. The resulting movement of the beam 312 causes the moveable end 328 to move upward as viewed in FIG. 7 to progressively block more of the inlet port 316. Closing the inlet port 316 reduces fluid flow into the first chamber 322, decreasing the pressure therein as the fluid drains to the outlet port 318. Once the inlet port 316 is fully closed, the MEMS microvalve 300 is in the second position (not shown), and as a result, no pilot signal is communicated through the pilot port 320.

As the flow of current drops, the respective first and second ribs 332 and 334 contract and the elongated spine 330 moves upward as viewed in FIG. 7, thereby causing the beam 312 to rotate in the generally clockwise direction. The resulting movement of the beam 312 causes the moveable end 328 to move downward and progressively open more of the inlet port 316. Opening the inlet port 316 allows more fluid to flow into the first chamber 322, increasing the pressure therein as the fluid flow overcomes the ability of the outlet port 318 to drain fluid from the first chamber 322. Once the inlet port 316 is substantially open, the MEMS microvalve 300 is again in the first position shown in FIG. 7. A strong pilot signal is thus communicated through the pilot port 320.

Referring to FIG. 8, and with continued reference to FIG. 7, a schematic cross-sectional view is shown for an example MEMS-based spool valve 400. The MEMS-based spool valve 400 includes a housing or body 410. The MEMS-based spool valve 400 may be formed, as with the microvalve 300 of FIG. 7, from several material layers such as semiconductor wafers. The body 410 may also be formed from multiple layers. For example, and without limitation, the cross-sectioned portions shown may be taken through a middle layer of the MEMS-based spool valve 400, with two other layers existing behind and in front of the middle layer relative to the view of FIG. 8.

The MEMS-based spool valve 400 may include a slider 412 configured to move to the left and to the right in FIG. 8 within a cavity 414 defined by the body 410. The slider 412 may be actuated by fluid pressure on a piloted surface 416, which is in fluid communication with a piloted chamber 420 of the cavity 414. Selective variation of pressure within the piloted chamber 420 alters the force applied to the piloted surface 416. The piloted chamber 420 may be in fluid communication with a pilot signal, such as the pilot signal produced by the pilot port 320 of the MEMS microvalve 300 shown in FIG. 7.

The slider 412 is formed with an elongated plate having a pair of oppositely disposed arms extending perpendicularly at a first end of the body so that the slider 412 is generally a T-shape, having the piloted surface 416 at a wider longitudinal end of the slider 412, and a counter surface 422 at a relatively narrower opposing longitudinal end of the slider 412. The cavity 414 is also generally a T-shape.

The body 410 shown in FIG. 8 defines a number of ports connecting with the cavity 414, some of which may be formed in cross-sectioned layers and some of which may be formed in other layers. The ports include a supply port 424, which is connectable to a source of high pressure fluid, such as the pump 33 of FIG. 1. The supply port 424 may be connected to the same source of high-pressure fluid as the inlet port 316 of the MEMS microvalve 300 shown in FIG. 7. The body 410 also defines a tank port 426, which is connected to a low-pressure reservoir or fluid return (not shown). The tank port 426 may be connected to the same source of low-pressure fluid as the outlet port 318 of the MEMS microvalve 300 shown in FIG. 7.

First and second load ports 428 and 430 are formed in the body 410 and communicate with the cavity 414. The first and second load ports 428 and 430 are disposed on opposite sides of the supply port 424. The first and second load ports 428 and 430 connect together to supply pressurized fluid to a hydraulically-actuated component of the transmission 14 of FIG. 1, e.g., the VBA 50 of FIG. 4 and the various rotating and braking clutches described above. Additional ports, channels, or troughs (not shown in FIG. 8) may be formed on the upper surface of the cavity 414 opposite the first load port 428 and the tank port 426. The additional troughs help balance flow forces acting on the slider 412.

The slider 412 includes three openings. A first opening 432, close to the piloted surface 416, is defined through the slider 412 to permit the fluid volume to equalize through the trough above the tank port 426 with the pressure at the tank port 426, balancing forces acting vertically, i.e., into and out of the view shown in FIG. 8, on the slider 412. A second opening 434 through the slider 412 forms an internal volume that is always in communication with the second load port 430.

Still referring to FIG. 8, a web 436 between the second opening 434 and the first opening 432 permits or prevents flow between the second load port 430 and the tank port 426, depending upon the position of the slider 412. In the illustrated position, the web 436 prevents flow between the second load port 430 and the tank port 426. When the web 436 moves to the right in FIG. 8, a fluid pathway between the second load port 430 and the tank port 426 is opened, venting any pressure present at the second load port 230 to the low pressure reservoir connected to the tank port 426.

A third opening 438 through the slider 412 permits the fluid volume in the trough above the first load port 428 to equalize with the pressure at the first load port 428, balancing forces acting vertically, i.e., into and out of the view shown in FIG. 8, on the slider 412. A web 440 between the second opening 434 and the third opening 438 prevents flow between the supply port 424 and the second load port 430 in all positions of the slider 412.

A web 442 between the third opening 438 and the counter surface 422 permits or prevents flow between the supply port 424 and the first load port 428, depending upon the position of the slider 412. In the illustrated position, the web 442 prevents flow between the supply port 424 and the first load port 428. When the slider 412 moves to the left in FIG. 8, a fluid pathway opens between the supply port 424 and the first load port 428, supplying pressurized fluid to the load connected to the first load port 428.

The slider 412 cooperates with the walls of the cavity 414 to define the piloted chamber 420 between the piloted surface 422 and the opposing wall of the cavity 414. A counter chamber 444 is defined between the counter surface 422 and the opposing wall of the cavity 414. The counter chamber 444 is in fluid communication with the first load port 428 at all times. Additionally, two volumes 446 and 448 may be defined between respective pairs of shoulders of the T-shaped plate forming the slider 412 and the shoulders of the T-shaped cavity 414. The volumes 446 and 448 are in communication with the tank port 426 at all times. In this manner, a hydraulic lock of the slider 412 is prevented.

The total area of the piloted surface 416 of the slider 412 is larger than the total area of the counter surface 422 of the slider 412. Therefore, when the pressures in the piloted chamber 420 and the counter chamber 444 are equal, the resultant unbalanced net force acting on the slider 412 will urge the slider 412 to the left in FIG. 8. The exact configuration of the ports and openings shown in the MEMS-based spool valve 400 and the slider 412 is not required. The MEMS-based spool valve 400 is configured to receive a relatively-small pilot signal, such as the pilot signal from the MEMS microvalve 300 of FIG. 7, and output a stronger signal, either for control or further piloting. When referring to fluidic signals, such as the pilot signal received by the MEMS-based spool valve 400, the term small may generally refer to relatively low flow volumetric flow. Therefore, the MEMS-based spool valve 400 of FIG. 8 can amplify the pilot signal and allow the pilot signal to control or pilot devices requiring higher flow or higher pressure than provided by the pilot signal alone.

While the best modes for carrying out the invention have been described in detail, those familiar with the art to which this invention relates will recognize various alternative designs and embodiments for practicing the invention within the scope of the appended claims.

The invention claimed is:

1. A vehicle comprising:
   an internal combustion engine;
   a hydrodynamic torque converter assembly having a torque converter clutch (TCC); and
   a transmission operably connected to the engine via the hydrodynamic torque converter assembly, wherein the transmission includes:
      a plurality of rotating clutches;
      a plurality of braking clutches;
      a transmission pump; and
      a valve body assembly (VBA) in fluid communication with the transmission pump, and having:
         a set of Micro Electro Mechanical Systems (MEMS) pressure sensors;
         a set of high-flow, hybrid MEMS flow control valves, wherein each MEMS pressure sensor and each of the hybrid MEMS flow control valves is in fluid communication with a corresponding one of the TCC, the rotating clutches, and the braking clutches;
         a first low-flow, fully MEMS valve operable to control line pressure to the VBA; and
         a second low-flow, fully MEMS valve operable to deliver fluid pressure to the TCC to thereby enable the TCC;
   wherein the VBA delivers fluid pressure to the rotating and braking clutches, alone or in different combinations, to thereby establish one of at least six different forward drive states of the transmission.

2. The vehicle of claim 1, wherein the set of high-flow, hybrid MEMS flow control valves includes six high-flow, hybrid MEMS solenoid valves.

3. The vehicle of claim 2, further comprising a stationary member and first and second gear sets, wherein each of the first and second gear sets includes first, second, and third nodes, and wherein the plurality of rotating and the plurality of braking clutches includes:
   a first rotating clutch that selectively connects the input member to the third node of the second gear set, and that is controlled via a first one of the hybrid MEMS solenoid valves;
   a second rotating clutch that selectively connects the second node of the first gear set to the first node of the second gear set, and that is controlled via a second one of the hybrid MEMS solenoid valves;
   a third rotating clutch that selectively connects the second node of the first gear set to the fourth node of the second gear set, and that is controlled via a third one of the MEMS solenoid valves;
   a first braking clutch that selectively connects the third node of the second gear set to the stationary member, and that is controlled via a fourth one of the hybrid MEMS solenoid valves; and
   a second braking clutch that selectively connects the fourth node of the second gear set to the stationary member, and that is controlled via a fifth one of the hybrid MEMS solenoid valves.

4. The vehicle of claim 2, further comprising a stationary member and first, second, and third gear sets each having first, second, and third nodes, wherein the plurality of rotating and braking clutches includes:
   a first rotating clutch that selectively connects the input member to the second node of the first gear set, and that is controlled via a first one of the hybrid MEMS solenoid valves;
   a second rotating clutch that selectively connects the input member to the third node of the first gear set, and that is controlled via a second one of the hybrid MEMS solenoid valves;
   a first braking clutch that selectively connects the third node of the first gear set to the stationary member, and that is controlled via a third one of the hybrid MEMS solenoid valves;
   a second braking clutch that selectively connects the second node of the first gear set to the stationary member, and that is controlled via a fourth one of the hybrid MEMS solenoid valves; and
   a third braking clutch that selectively connects the first node of the third gear set to the stationary member, and that is controlled via a fifth one of the hybrid MEMS solenoid valves;

wherein the output member is continuously connected to the second node of the third gear set, and the input member is continuously connected to the third node of the second gear set.

5. The vehicle of claim 2, wherein each of the hybrid MEMS solenoid valves is rated for at least 250 PSIG and a flow rate of at least 10 L/min.

6. The vehicle of claim 2, wherein the hybrid MEMS solenoid valves includes two normally-high and four normally-low hybrid MEMS solenoid valves.

7. The vehicle of claim 1, further comprising a non-MEMS control valve in fluid communication with the TCC, wherein the second low-flow, fully MEMS valve is a normally-low, on/off solenoid valve in fluid communication with the non-MEMS control valve.

8. The vehicle of claim 1, wherein the first low-flow, fully MEMS valve is in fluid communication with the second low-flow, fully MEMS valve.

9. The vehicle of claim 1, wherein the hybrid MEMS flow control valves, the MEMS pressure sensors, and the first and second low-flow, fully MEMS valves are all connected to a common surface of the VBA.

10. A transmission operably connected to an engine via a hydrodynamic torque converter assembly, wherein the transmission includes:
  a plurality of rotating clutches;
  a plurality of braking clutches;
  a transmission pump; and
  a valve body assembly (VBA) in fluid communication with the transmission pump, and having:
    a set of Micro Electro Mechanical Systems (MEMS) pressure sensors;
    a set of high-flow, hybrid MEMS flow control valves, wherein each hybrid MEMS pressure sensor and each of hybrid MEMS control valve is in fluid communication with, and configured to sense fluid pressure in, a corresponding one of the TCC, the rotating clutches, and the braking clutches;
    a first low-flow, fully MEMS valve operable to control line pressure to the VBA; and
    a second low-flow, fully MEMS valve operable to deliver fluid pressure to the TCC to thereby enable the TCC;
  wherein the VBA delivers fluid pressure to the rotating and braking clutches, alone or in different combinations, to thereby establish one of at least six different forward drive states of the transmission.

11. The transmission of claim 10, wherein the set of high-flow, hybrid MEMS flow control valves include six hybrid MEMS solenoid valves.

12. The transmission of claim 11, further comprising a stationary member and first and second gear sets, wherein each of the first and second gear sets includes a plurality of nodes, and wherein the plurality of rotating and the plurality of braking clutches include:
  a first rotating clutch that selectively connects the input member to a third node of the second gear set, and that is controlled via a first one of the hybrid MEMS solenoid valves;
  a second rotating clutch that selectively connects the second node of the first gear set to the first node of the second gear set, and that is controlled via a second one of the hybrid MEMS solenoid valves;
  a third rotating clutch that selectively connects the second node of the first gear set to a fourth node of the second gear set, and that is controlled via a third one of the hybrid MEMS solenoid valves;
  a first braking clutch that selectively connects a third node of the second gear set to the stationary member, and that is controlled via a fourth one of the hybrid MEMS solenoid valves; and
  a second braking clutch that selectively connects the fourth node of the second gear set to the stationary member, and that is controlled via a fifth one of the hybrid MEMS solenoid valves.

13. The transmission of claim 11, further comprising a stationary member and first, second, and third gear sets each having first, second, and third nodes, wherein the plurality of rotating and braking clutches includes:
  a first rotating clutch that selectively connects the input member to the second node of the first gear set, and that is controlled via a first one of the MEMS solenoid valves;
  a second rotating clutch that selectively connects the input member to the third node of the first gear set, and that is controlled via a second one of the MEMS solenoid valves;
  a first braking clutch that selectively connects the third node of the first gear set to the stationary member, and that is controlled via a third one of the hybrid MEMS solenoid valves;
  a second braking clutch that selectively connects the second node of the first gear set to the stationary member, and that is controlled via a fourth one of hybrid MEMS solenoid valves; and
  a third braking clutch that selectively connects the first node of the third gear set to the stationary member, and that is controlled via a fifth one of the hybrid MEMS solenoid valves;
  wherein the output member is continuously connected to the second node of the third gear set, and the input member is continuously connected to the third node of the second gear set.

14. The transmission of claim 11, wherein each of the hybrid MEMS solenoid valves is rated for at least 250 PSIG and a flow rate of at least 10 L/min.

15. The transmission of claim 11, wherein the MEMS solenoid valves includes four normally-low and two normally-high MEMS solenoid valves.

16. The transmission of claim 10, further comprising a control valve in fluid communication with the TCC, wherein the second low-flow, fully MEMS valve is a normally-low, on/off solenoid valve in fluid communication with the control valve.

17. The transmission of claim 10, wherein the first low-flow, fully MEMS valve is in fluid communication with the second low-flow, fully MEMS valve.

18. The transmission of claim 10, wherein the hybrid MEMS flow control valves, the MEMS pressure sensors, and the first and second low-flow, fully MEMS valves are all connected to a common surface of the VBA.

* * * * *